(12) United States Patent
Stephan et al.

(10) Patent No.: US 11,143,436 B1
(45) Date of Patent: Oct. 12, 2021

(54) HIDDEN END CLAMP

(71) Applicant: PEGASUS SOLAR, INC., Richmond, CA (US)

(72) Inventors: Erich Kai Stephan, Richmond, CA (US); Glenn Harris, Richmond, CA (US); Peter Wilke, Richmond, CA (US); Nicholas Wenzel, Richmond, CA (US); James Hsieh, Richmond, CA (US)

(73) Assignee: PEGASUS SOLAR, INC., Richmond, CA (US)

( * ) Notice: Subject to any disclaimer, the term of this patent is extended or adjusted under 35 U.S.C. 154(b) by 0 days.

(21) Appl. No.: 17/120,534

(22) Filed: Dec. 14, 2020

(51) Int. Cl.
*F24S 25/60* (2018.01)
*F24S 25/30* (2018.01)
*H02S 20/00* (2014.01)
*F24S 25/00* (2018.01)

(52) U.S. Cl.
CPC .............. *F24S 25/60* (2018.05); *F24S 25/30* (2018.05); *H02S 20/00* (2013.01); *F24S 2025/6003* (2018.05); *F24S 2025/6006* (2018.05); *F24S 2025/804* (2018.05)

(58) Field of Classification Search
CPC .. F24S 25/60; F24S 25/30; F24S 25/33; F24S 25/636; F24S 25/00; F24S 25/634; F24S 25/70; F24S 2025/804; F24S 2025/6006; F24S 2025/6003; H02S 20/00; H02S 20/23; H02S 30/10; Y02B 10/10; Y02B 10/20; Y02E 10/47; Y02E 10/50; Y10T 24/44265; Y10T 24/44641; Y10T 24/44; Y10T 24/44017; Y10T 29/49355
See application file for complete search history.

(56) References Cited

U.S. PATENT DOCUMENTS

| | | | |
|---|---|---|---|
| 7,077,855 B2 * | 7/2006 | Curtis | A61H 39/04 606/151 |
| 8,567,030 B2 | 10/2013 | Koch et al. | |
| 9,249,813 B2 * | 2/2016 | Kalman | B64C 1/066 |
| 9,473,066 B2 | 10/2016 | Stephan et al. | |
| 9,893,677 B1 * | 2/2018 | Liu | H02S 20/23 |
| 10,218,305 B1 * | 2/2019 | Schrock | F16B 5/123 |
| 2008/0310913 A1 | 12/2008 | Urban et al. | |
| 2011/0001030 A1 | 1/2011 | Hochreiter et al. | |
| 2014/0042286 A1 * | 2/2014 | Jaffari | F16B 2/065 248/316.4 |
| 2015/0316086 A1 | 11/2015 | Urban et al. | |
| 2016/0282018 A1 * | 9/2016 | Ash | F24S 25/634 |
| 2016/0285408 A1 * | 9/2016 | Ash | H02S 40/34 |
| 2018/0367093 A1 * | 12/2018 | Ayers | F24S 25/33 |

OTHER PUBLICATIONS

International Search Report and Written Opinion from the International Searching Authority, dated Apr. 20, 2021, 11 pages, for corresponding International Patent Application No. PCT/US2020/065160.

* cited by examiner

*Primary Examiner* — Jessie T Fonseca
(74) *Attorney, Agent, or Firm* — Polsinelli LLP (57) ABSTRACT

A clamp particularly designed for use on the end of a solar module mounting rail, includes two hinged parts that can be adjusted by a fastener to clamp a solar module to the rail. A pull-tab with toothed catches helps to position the clamp during installation, and also prevents the clamp from sliding too far into the rail, while a grip body increases friction and electrical contact between the solar module and the clamp.

19 Claims, 9 Drawing Sheets

HIDDEN END CLAMP

BACKGROUND

Current solar mounting solutions using rails as a mounting structure use clamps to secure a solar module to the rail that can be diminish the final aesthetic appearance. Often, clamps on the end of a row of solar modules are visible to the observer.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
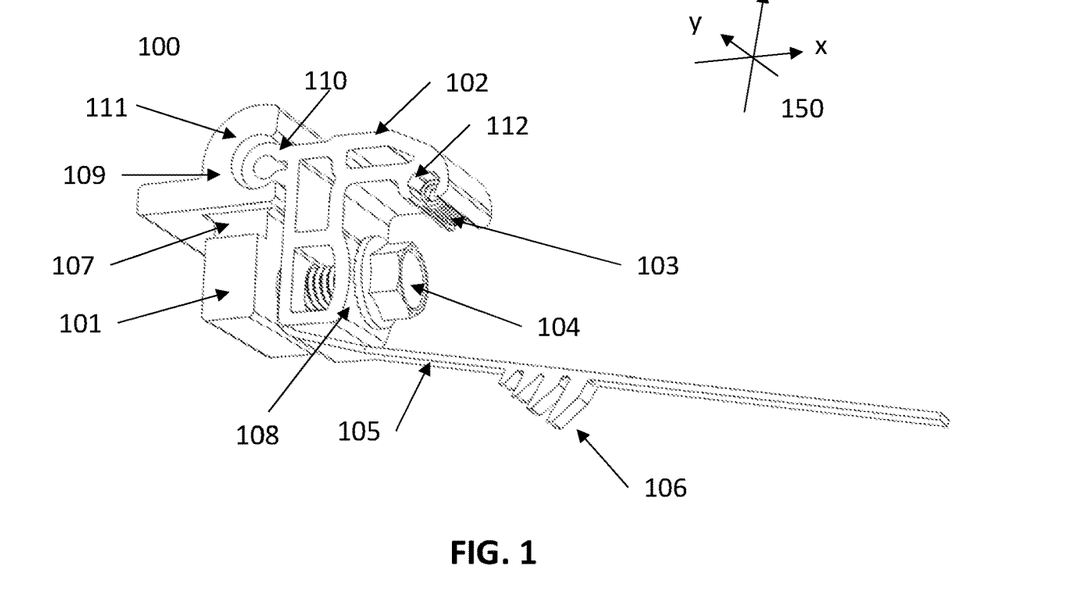
FIG. 1 illustrates an isometric view of a Clamp.

FIG. 1 illustrates an isometric view of the Clamp 100. The Clamp 100 is an assembly of a Clamp Block 101, a Clamp Arm 102, a Grip Body 103, a Fastener 104, and a Pull-Tab 105. The Clamp 100 is oriented in the X, Y, and Z cartesian coordinate planes 150. The Clamp Block 101 and Clamp Arm 102 are held together at Hinge 109; wherein a Hinge Pin 110 integral to Clamp Arm 102 rotatably couples into a Hinge Socket 111 integral to Clamp Block 101. The Hinge 109 holds the Clamp Block 101 and Clamp Arm 102 from movement in the Z and X directions, but allow for rotation around the Y axis as well as lateral movement along the Y axis to couple and de-couple the Clamp Block 101 and Clamp Arm 102. Clamp Block 101 may have one or more Grooves 107 that are substantially in line with the X axis. The Grooves 107 may be on both sides of the Clamp Block 101. The Grooves 107 may be dimensioned to interface with a Rail (not shown). Clamp Arm 102 may have a Rounded Surface 108 that interfaces with the head of Fastener 104.

The Grip Body 103 may be threadably secured or press-fit into the Grip Socket 112 on the Clamp Arm 102. Grip Body 103 may be a threaded bolt, a screw, a set screw, a threaded rod, or a solid triangular, rectangular, pentangular, hexagonal, or similar shaped rod. The Grip Body 103 may partially extend beyond the lower surface of the Grip Socket 112 and Clamp Arm 102. Pull-tab 105 may have one or more Catches 106. The Catches 106 may be in varied lengths, or increasing lengths as the catches progress along the positive X axis.

Figure 2:
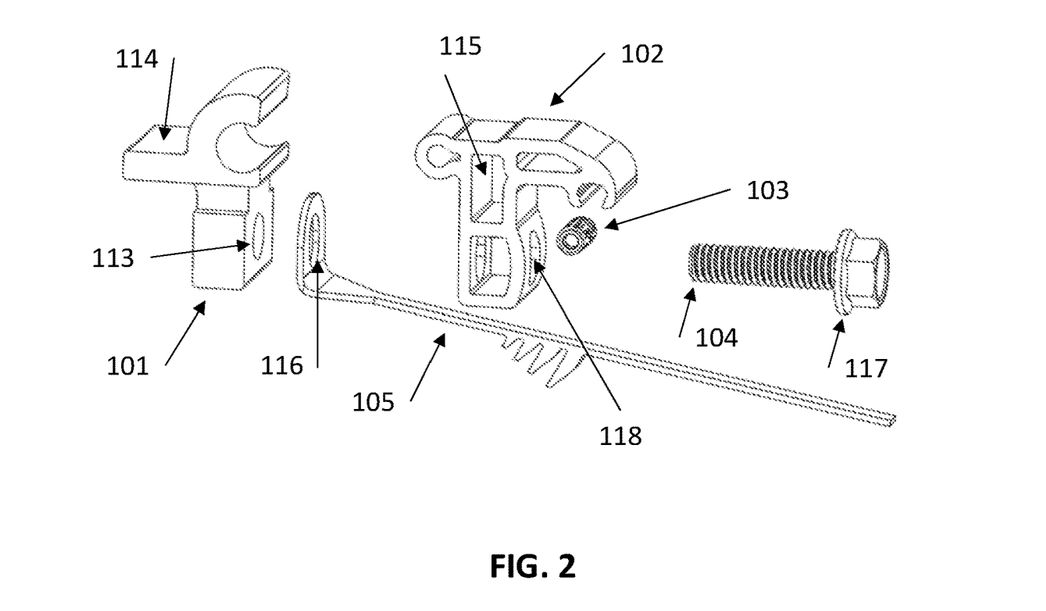
FIG. 2 illustrates an exploded isometric view of a Clamp.

FIG. 2 illustrates an exploded view of the present invention. Clamp Block 101 may have an Threaded Aperture 113 disposed cross-wise through the body, wherein said Threaded Aperture 113 being partially or fully threaded. The Threaded Aperture 113 is meant to threadably engage Fastener 104. The Fastener 104 would extend through one or more Arm Apertures 118, a Pull-tab Aperture 116, and into the Threaded Aperture 113. After the Hinge Pin 110 is substantially concentrically assembled with Hinge Socket 111, and then upon the Fastener 104 being inserted through one or more Arm Apertures 118, Pull-tab Aperture 116, and into Threaded Aperture 113, the Clamp Block 101 and Clamp Arm 102 would be substantially prevented from movement relative to one another along the Y axis. The Arm Aperture 118 may be circular or may be slotted. In either case, the excess gap in the Z direction between the total Z distance of the Arm Aperture 118 and the diameter of the main shank of the Fastener 104 would constrict the rotation of the Clamp Arm 102 around the Y-Axis at the Hinge 109 relative to the Clamp Block 101. The Clamp Block 101 may have a Flange 114 that extends laterally along the X axis away from the main body of the Clamp Block 101. Clamp Arm 102 may have one or more Arm Hallows 115 throughout its surface that extend along the Y axis. The Arm Hallows 115 may improve manufacturability of the Clamp Arm 102, reduce material used, and reduce weight. The Pull-tab 105 may have a long thin flange with a perpendicular or obtusely angled flange at one end. The angled flange may have the Pull-tab aperture disposed through. Fastener 104 may have a Flange Head 117 on the distal end. The Flange Head 117 may have a diameter that extends beyond the width in the Y direction of the Arm Aperture 118.

Figure 3:
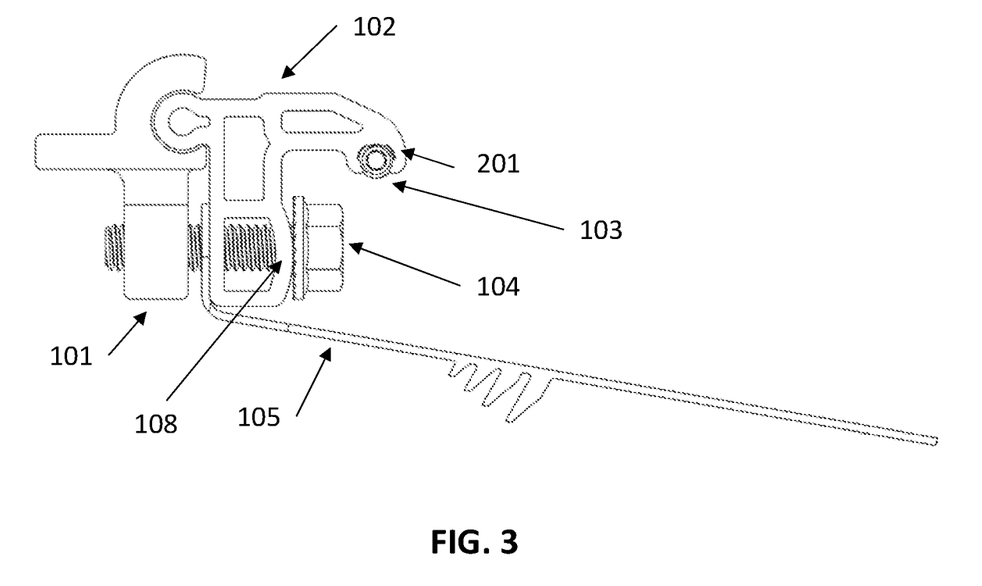
FIG. 3 illustrates a side view of a Clamp.
Figure 4:
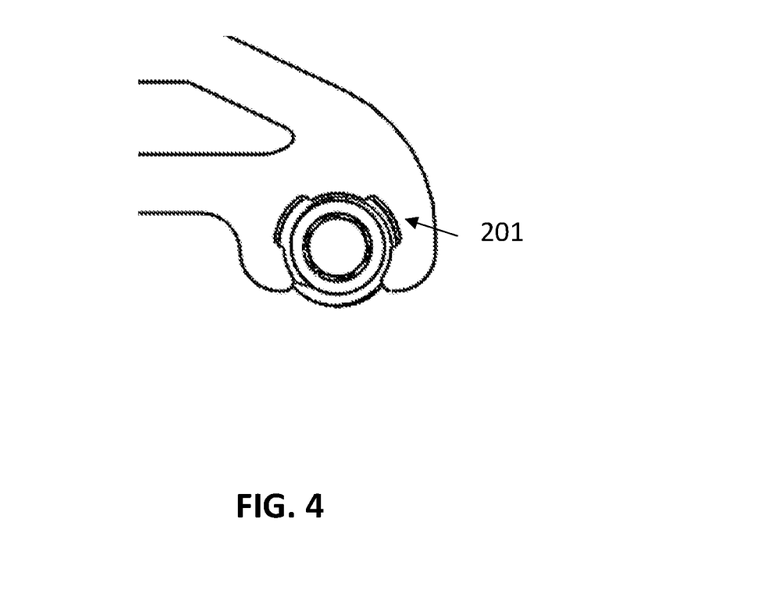
FIG. 4 illustrates a side view focusing on a Grip Body.

FIG. 3 illustrates depicts a side view of the present invention looking down the Y axis, and FIG. 4 illustrates a close-up view of the Clamp Arm 102 at the Grip Socket 112. In this embodiment, the Pull-tab 105 is formed with an obtuse angle between the main body and its flange. The Grip Socket 112 may have one or more Reliefs 201 that reduced the engaged surface of the Grip Body 103 to allow for easier installation of the Grip Body 103 into the Grip Socket 112. The Reliefs 201 may extend away from the central axis of the Grip Socket greater than the outer dimension of a thread on the Grip Body 103, or may partially extend away from the central axis of the Grip Socket 112 such that threads of the Grip Body 103 partially engage the Clamp Arm 102 in the area of the Reliefs 201.

Figure 5:
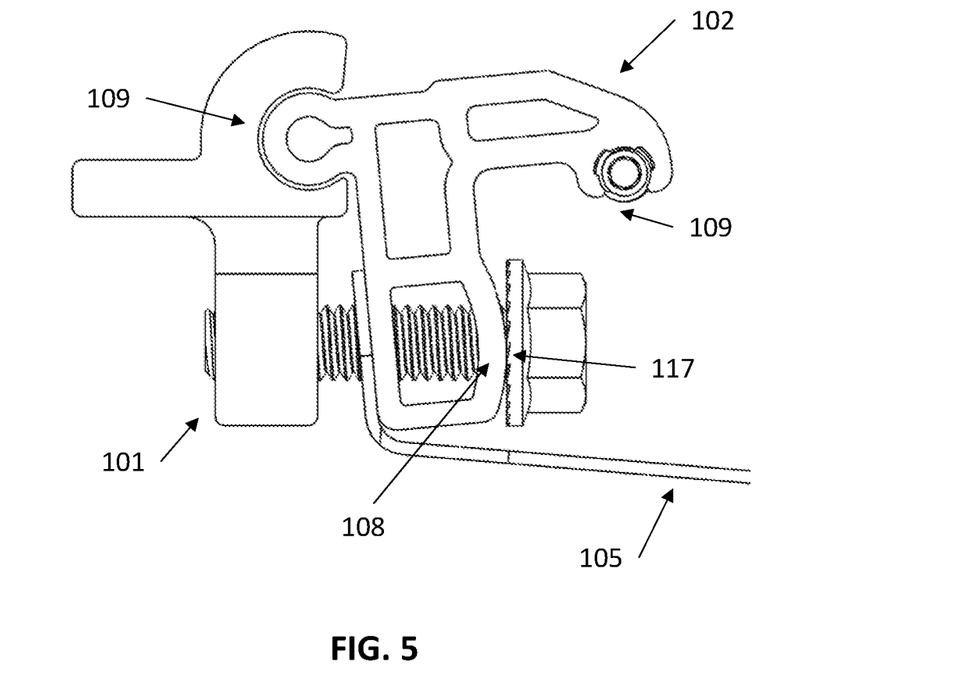
FIGS. 5 and 6 illustrate side views of a Clamp with the fastener in different degrees of tightness.
Figure 6:
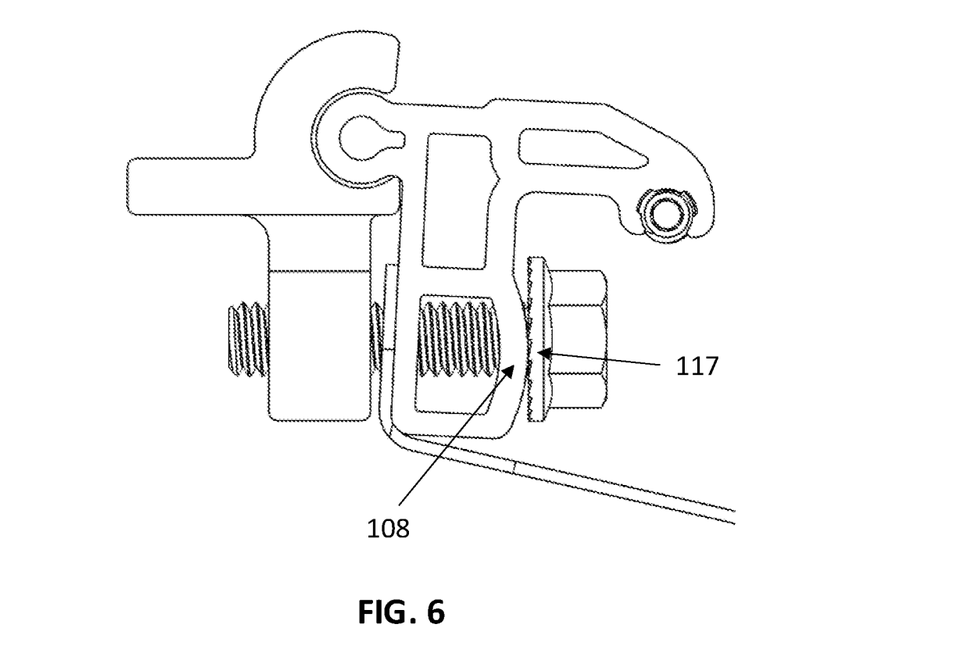

FIGS. 5 and 6 illustrate examples of the rotation of the Clamp Arm 102 around the axis of the Hinge 109 relative to the Clamp Block 101. FIG. 5 illustrates the Clamp Arm 102 rotated around the axis of Hinge 109 in a counter-clockwise direction, thereby elevating the Grip Body 103 in the positive Z direction. The Fastener 104 may be threadably engaged to move in the positive X direction, and the Pull-tab 105 may be pulled in the positive X direction, thereby pulling the lower portion of the Clamp Arm 102 in the positive X direction and causing the counter-clockwise rotation. FIG. 6 illustrates how the Fastener 104 may be threadably engaged in an opposite direction with the Threaded Aperture 113 of the Clamp Block 101 to pull the lower portion of Clamp Arm 102 in the negative X direction, causing the Clamp Arm to rotate clockwise around the axis of Hinge 109. In this action, the Grip Body 103 is moved in the negative Z direction. In conjunction, the Flange Head 117 coincides with the Rounded Surface 108. The Rounded Surface 108 has a curvature such that the central Y plane of Flange Head 117 is contacting the Rounded Surface 108 when the Clamp Arm 102 is rotated counter-clockwise, as seen in FIG. 5, and the central Y-plane of the Flange Head 117 also contacts the Rounded Surface 108 when the Clamp Arm 102 is rotated clockwise.

Figure 7:
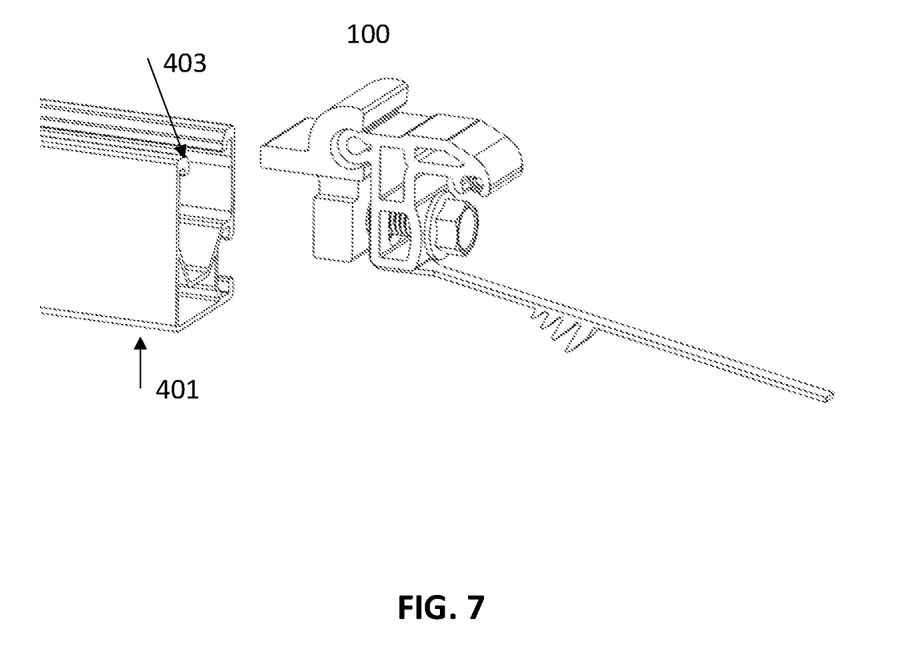
FIGS. 7, 8 and 9 illustrate isometric views of a Clamp as it is inserted into a Rail.
Figure 8:
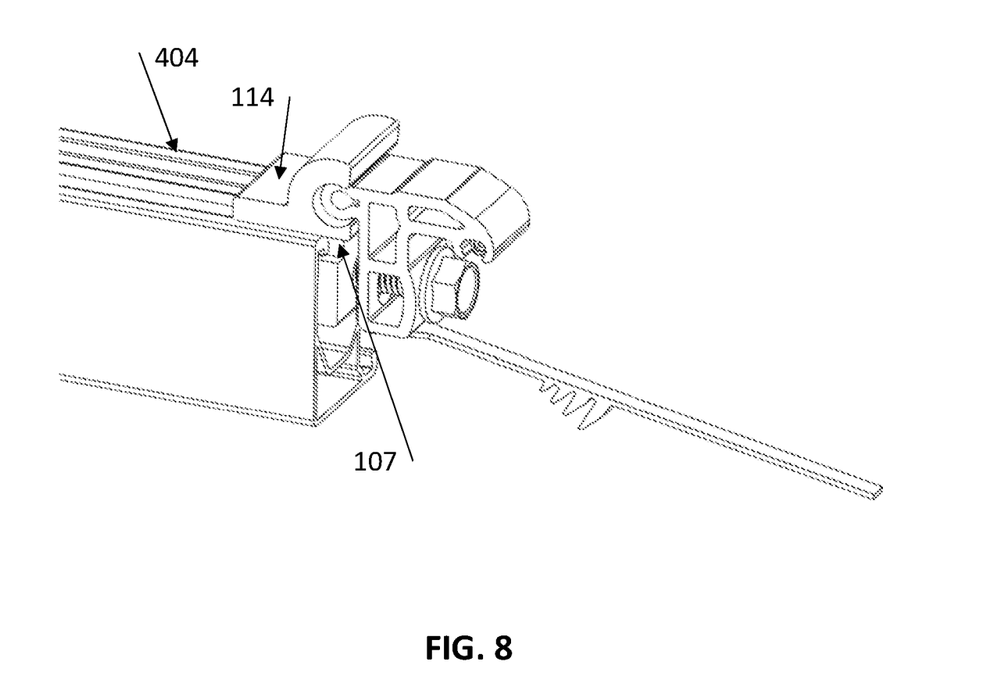
Figure 9:
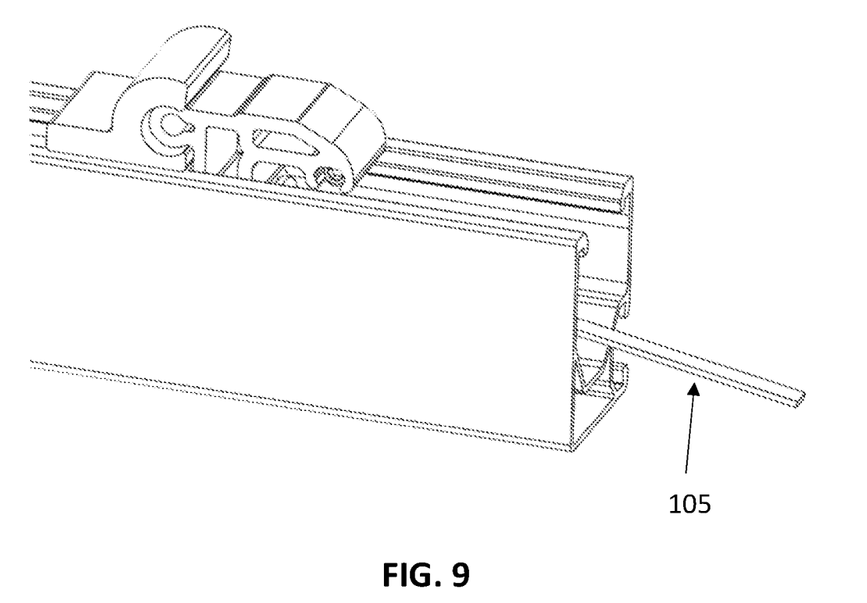

FIGS. 5-11 illustrate the installation process of the Clamp 100 into a Rail 401 and securing a Solar Module Frame 402. In FIG. 7, the Clamp 100 is generally aligned with the end of the Rail 401. Rail 401 has a Rail Flange 403 extending towards the centerline of the Rail 401 from the top area of the side walls of the Rail 401. FIG. 8 demonstrates the Clamp 100 partially inserted into the open end of Rail 401, and slid into the Rail 401 along the length of Rail 401. In this state, Flange 114 is resting on Rail Top Edge 404, and Grooves 107 are aligned with Rail Flange 403 to allow for the Clamp 100 to slide into Rail 401 unobstructed. FIG. 9 illustrates the Clamp 100 slide further into the Rail 401, with a portion of the Pull-tab 105 extending beyond the end of the Rail 401. In this state, the Clamp 100 is prevented from moving in the Z or Y directions by the interface between the Flange 114 and the Rail Top Edge 404, and between the Grooves 107 and the Rail Flange 403.

Figure 10:
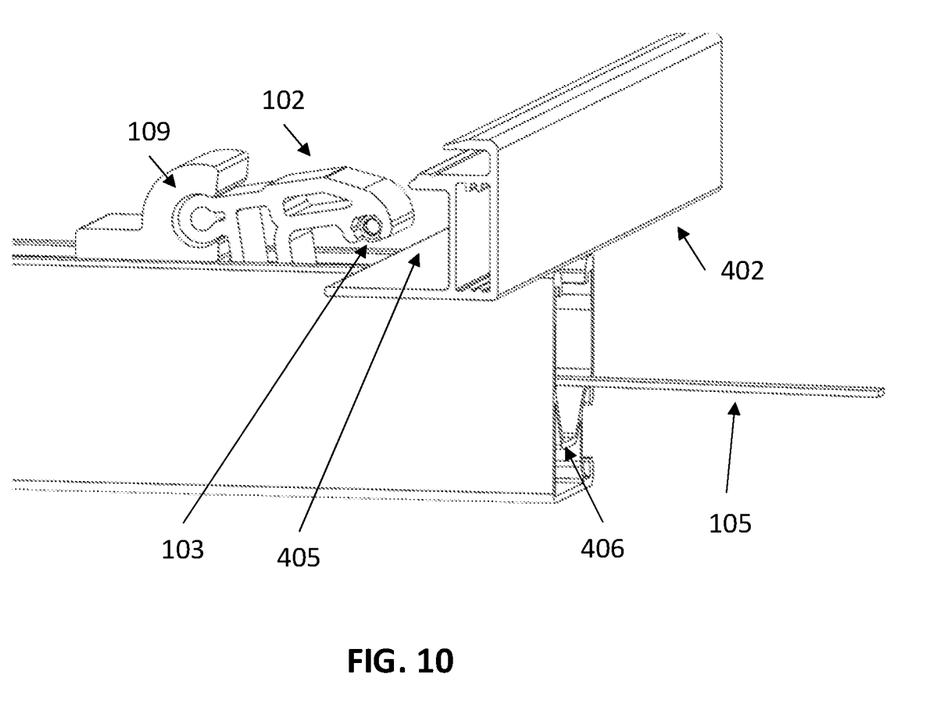
FIGS. 10 and 11 illustrate isometric views of a Clamp as it is attached to a Rail and a Solar Module.

FIG. 10 illustrates a Solar Module Frame 402 placed on to the Rail 401 and resting on the Rail Top Edge 404. The Solar Module Frame 402 may already be assembled with a solar module, consisting of 4 Solar Module Frames 402 of similar or different geometry and length, supporting a solar energy collection device. In the example embodiment shown, the outside face of the Solar Module Frame 402 is substantially planar with the end face of the Rail 401. In other example embodiments, the Solar Module Frame 402 may be offset from the end face of the Rail 401 positively or negatively. Once the Solar Module Frame 402 has been placed on to the Rail 401 (as shown), the Pull-tab 105 may be pulled in the positive X direction in order to advance the Clamp 100 towards the end of the Rail 401 and the Solar Module Frame 402. In conjunction, the Pull-tab 105 may rotate the Clamp Arm 102 about Hinge 109 so that the Grip Body 103 elevates above the Frame Lip 405. The Pull-tab 105 resides above Rail Crossbar 406. Upon being pulled in the positive X direction, the Pull-tab 105 may advance the Clamp 100 also in the positive X direction until the Clamp Arm 102 interferes with the Solar Module Frame 402, as seen in FIG. 11.

Figure 11:
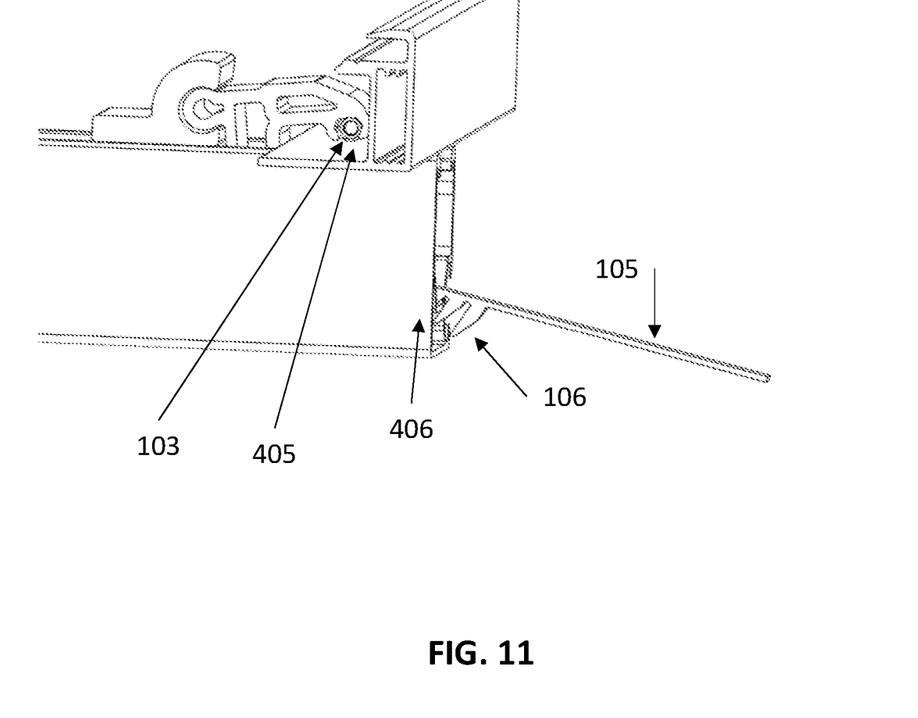

FIG. 11 illustrates the Clamp 100 installed into the Rail 401 and substantially advanced in the positive X direction to allow for the Grip Body 103 to clamp onto the Frame Lip 405. In this example embodiment of the present invention, the Grip Body 103 is a threaded rod wherein the threads extend lower than the Grip Socket 112 such that the threads clamp onto the Frame Lip 405. As the Fastener 104 is threadably engaged with the Threaded Aperture 113, the resulting forces transfer to the Grip Body 103 compressing the Flange Lip 405 into the Rail 401. The protrusions of the Grip Body 103 may be of a material with a hardness greater than the Flange Lip 405 such that said protrusions, such as threads, pierce into the surface of Flange Lip 405. Alternatively, the protrusions of Grip Body 103 may increase the friction between the Grip Body 103 and the Flange Lip 405 relative to a smooth or substantially flat Grip Body 103 or a Clamp Arm 102 not containing any Grip Body 103. The protrusions of Grip Body 103 may substantially increase the force required for the Solar Module Frame 402 to move along the X and Y planes. The protrusions of Grip Body 103 may pierce a coating on the Flange Lip 405 to allow for an electrical bonding connection between the Solar Module Frame 402 and the Clamp Arm 102.

Figure 12:
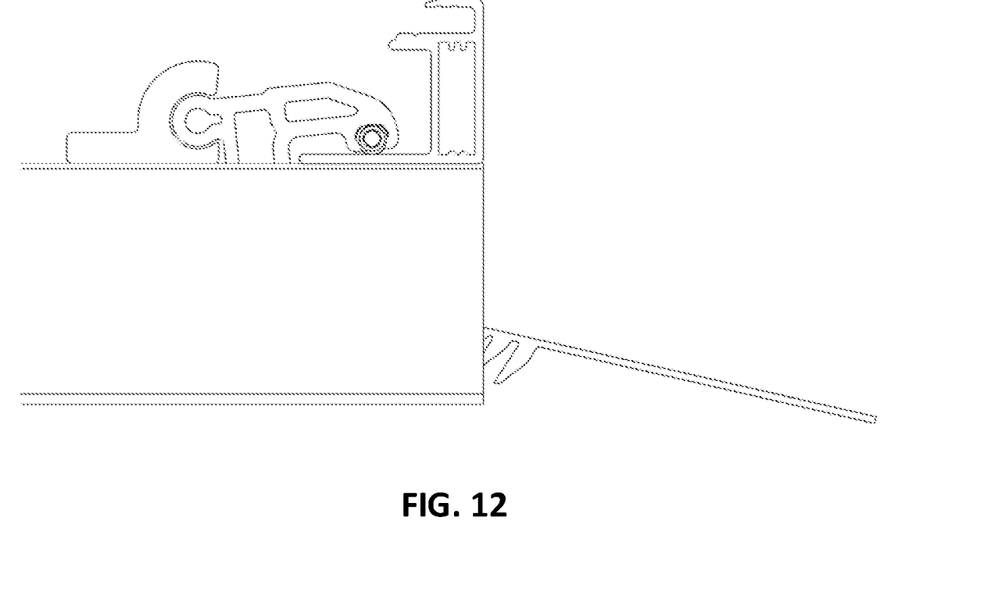
FIG. 12 illustrates a side view of a Clamp attached to a Rail and to a Solar Module.

FIG. 11 also illustrates the Catches 106 on the Pull-tab 105 interfacing with the Rail Crossbar 406 in order to prevent the Clamp 100 from substantially moving in the negative X direction. Once the Clamp 100 has been installed in the Rail 401 and advanced in the positive X direction so the Grip Body 103 is above the Flange Lip 405, the Pull-tab 105 may be lowered so that the Catches 106 interface with the Rail Crossbar 406. This will prevent the Clamp 100 from sliding away from the Flange Lip 405 when a tool is used to engage with the Fastener 104. One or more Catches 106 may be employed to compensate for varied widths of Flange Lips 405, and to compensate for a positive or negative offset from the outside wall of the Solar Module Frame 402 and the end surface of the Rail 401. The Catches 106 may have different lengths relative to one another to allow for a first Catch 106 to not lift a second Catch 106 above the Rail Crossbar 406 when a first Catch 106 is resting on top of the Rail Crossbar 406. FIG. 12 illustrates a side view of FIG. 11.

Figure 13:
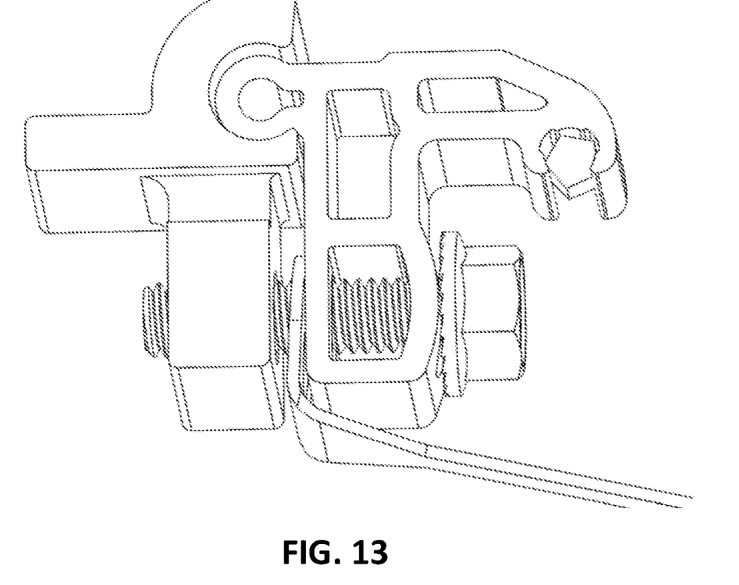
FIGS. 13-15 illustrate isometric views of a Clamp with alternative Grip Body configurations.
Figure 14:
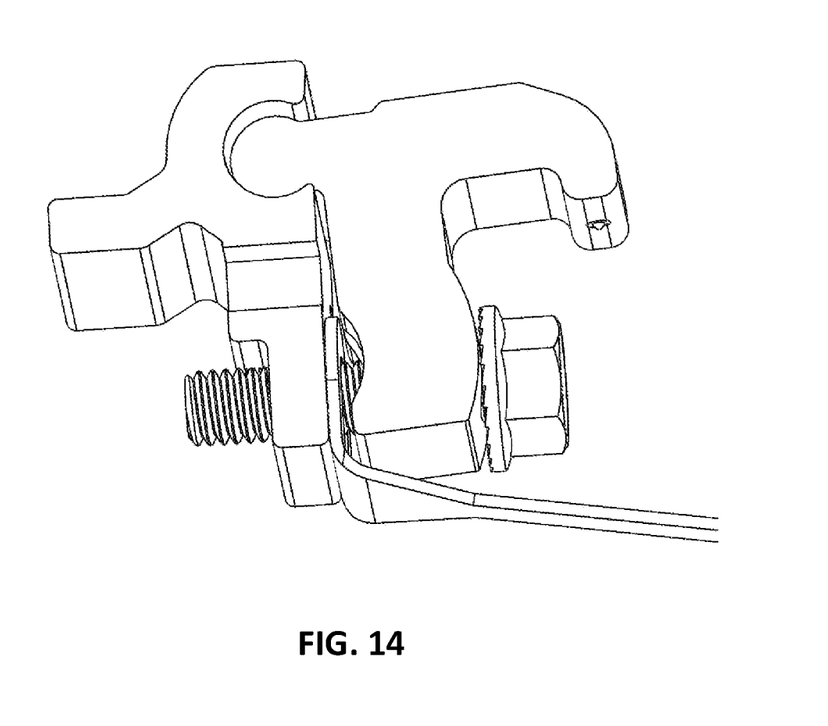
Figure 15:
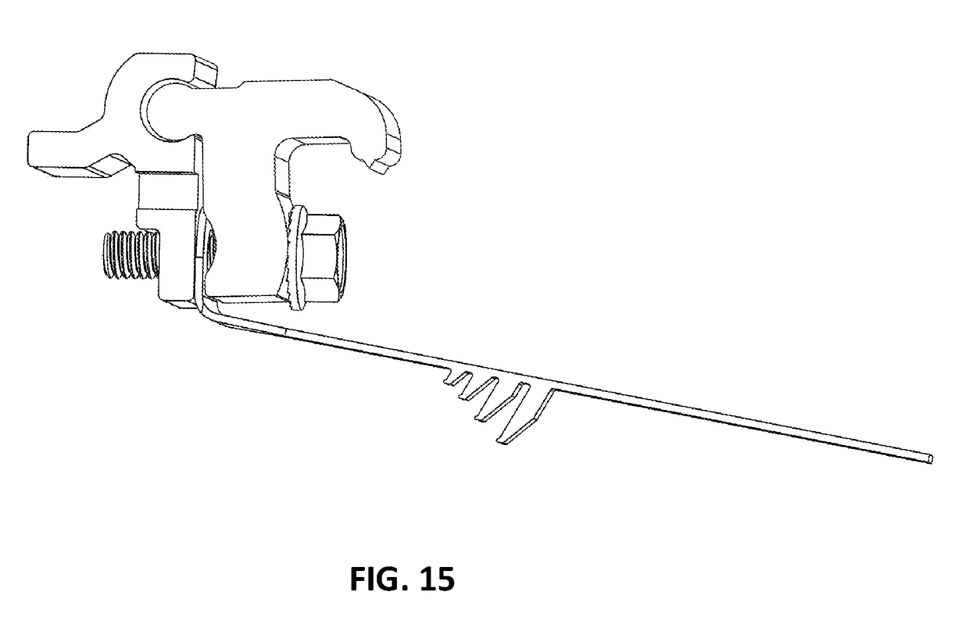

FIGS. 13-15 illustrate alternate Grip Body shapes. In FIG. 13 the Grip Body is multi-sided. In FIG. 14 the Grip Body is a pressed-in hardened point. In FIG. 15 the Grip Body is a sharp point. The Grip Body might also be triangular, square, pentagonal, or other number of sides. The fewer the number of sides, the sharper the corner, and better penetration. However, it can be harder to hold a triangular body than a body with more sides.

Figure 16:
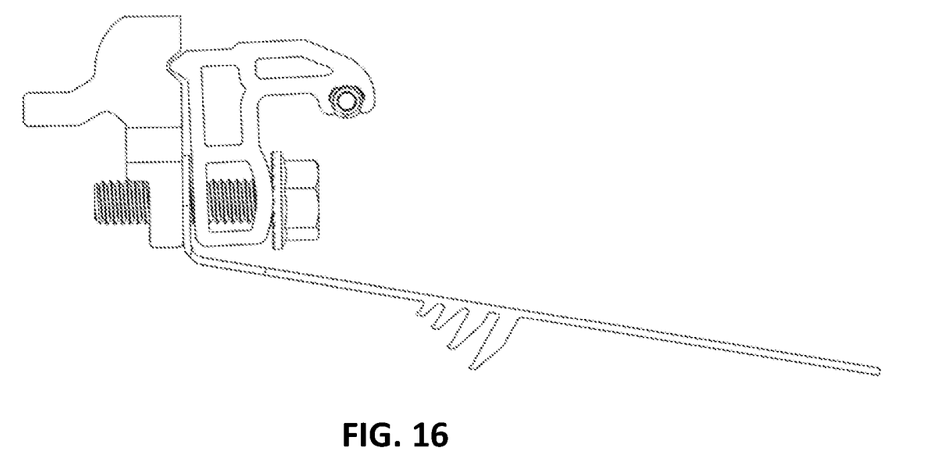
FIGS. 16 and 17 illustrate views of an alternative configuration using a fulcrum in place of a hinge.
Figure 17:
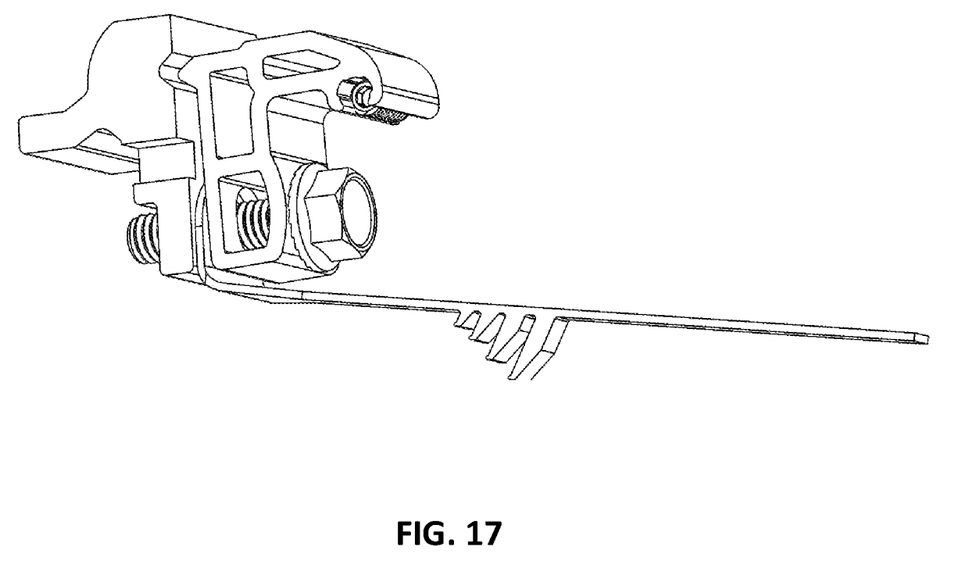

FIGS. 16 and 17 illustrate an alternative configuration, where a fulcrum and fulcrum grove are used instead of a hinge. Although not illustrated, it is also possible to include only a pivot protrusion, such as a fulcrum or a hinge pin, and leave the corresponding pivot contact as a surface flat, without a hinge socket or a fulcrum grove.

Although illustrative embodiments have been described herein in detail, it should be noted and will be appreciated by those skilled in the art that numerous variations may be made within the scope of this invention without departing from the principle of this invention and without sacrificing its chief advantages. For example features that appear in one embodiment of a particular figure are also applicable to embodiments that are illustrated in other figures.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

The invention claimed is:

1. A solar module clamp, comprising:
    a threaded fastener;
    a clamp block, the clamp block including at least:
        a threaded aperture configured to receive the threaded fastener; and
        a pivot contact;
    a grip body, wherein the grip body pierces a coating on a solar module frame, forming an electrical bond path between the solar module frame and the solar module clamp; and
    a clamp arm, the clamp arm including at least:
        an aperture configured for through-passage of the threaded fastener;

a pivot protrusion configured to engage the pivot contact; and
a grip socket configured to retain the grip body.

2. The solar module clamp of claim 1, wherein the clamp block further comprises a flange configured to contact a top edge of a rail.

3. The solar module clamp of claim 2, wherein the clamp block further comprises at least one groove configured to contact a rail flange of the rail, the rail flange and the at least one groove cooperating to slideably retain the clamp block in the rail.

4. The solar module clamp of claim 1, wherein the grip body further comprises a textured surface.

5. The solar module clamp of claim 4, wherein the textured surface comprises external threads on a screw.

6. The solar module clamp of claim 4, wherein the textured surface comprises a multi-sided insert.

7. The solar module clamp of claim 4, wherein the textured surface comprises a hard pin.

8. The solar module clamp of claim 4, wherein the textured surface comprises an integrated feature of the clamp arm.

9. The solar module clamp of claim 1, further comprising:
a pull-tab including at least:
a pull-tab aperture; and
a long thin flange.

10. The solar module clamp of claim 9, further comprising at least one toothed catch on the long thin flange.

11. The solar module clamp of claim 1, wherein the clamp block is an aluminum extrusion with at least one groove cut in the aluminum extrusion, and the clamp arm is an aluminum extrusion.

12. A solar module clamp, comprising:
a threaded fastener;
a clamp block, the clamp block including at least:
a threaded aperture configured to receive the threaded fastener; and
a pivot contact;
a clamp arm, the clamp arm including at least:
an aperture configured for through-passage of the threaded fastener; and
a pivot protrusion configured to engage the pivot contact; and
a pull-tab, the pull-tab including at least:
a pull-tab aperture configured for through-passage of the threaded fastener; and
a long thin flange.

13. The solar module clamp of claim 12, wherein the clamp block further comprises a flange configured to contact a top edge of a rail.

14. The solar module clamp of claim 13, wherein the clamp block further comprises at least one groove configured to contact a rail flange of the rail, the rail flange and the at least one groove cooperating to slideably retain the clamp block in the rail.

15. The solar module clamp of claim 12, wherein the clamp block is an aluminum extrusion with at least one groove machined in the aluminum extrusion, and the clamp arm is an aluminum extrusion.

16. The solar module clamp of claim 12, wherein the pivot contact is one of a flat surface, a hinge socket or a fulcrum groove, and the pivot protrusion is one of a hinge pin or a fulcrum.

17. The solar module clamp of claim 12, further comprising a grip body, wherein the clamp arm further comprises a grip socket configured to retain the grip body.

18. The solar module clamp of claim 17, wherein the grip body comprises external threads on a screw or a multi-sided insert.

19. The solar module clamp of claim 17, wherein the grip body pierces a coating on a solar module frame to form an electrical bond path between the solar module frame and the solar module clamp.

* * * * *